(12) United States Patent
Cheng et al.

(10) Patent No.: US 8,508,925 B2
(45) Date of Patent: Aug. 13, 2013

(54) PORTABLE ELECTRONIC DEVICE

(75) Inventors: Wen-Lin Cheng, Hsinchu (TW); Han-Ping Kuo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/326,276

(22) Filed: Dec. 14, 2011

(65) Prior Publication Data

US 2013/0044413 A1    Feb. 21, 2013

(30) Foreign Application Priority Data

Aug. 19, 2011    (TW) .............................. 100129770 A

(51) Int. Cl.
*H05K 5/00*    (2006.01)
*H05K 7/00*    (2006.01)
*G06F 3/02*    (2006.01)

(52) U.S. Cl.
USPC ............ 361/679.27; 361/679.28; 361/679.26; 361/679.3; 345/169

(58) Field of Classification Search
USPC ............. 361/679.01–679.17, 679.08, 679.09, 361/679.21–679.3, 679.55–679.59; 345/156, 345/157, 168, 169, 184
See application file for complete search history.

(56) References Cited

U.S. PATENT DOCUMENTS

2011/0263304 A1*    10/2011    Laido et al. ................ 455/575.3

FOREIGN PATENT DOCUMENTS

| TW | M307251 | 3/2007 |
| TW | 201023594 | 6/2010 |
| TW | M380673 | 5/2011 |

* cited by examiner

*Primary Examiner* — Jayprakash N Gandhi
*Assistant Examiner* — Jerry Wu
(74) *Attorney, Agent, or Firm* — Jianq Chyun IP Office

(57) ABSTRACT

A portable electronic device includes a first body, a second body and a linkage. The first body has a first upper surface, and the second body has a second upper surface. An end of the linkage is coupled to the first body through a first pivot shaft and another end of the linkage is coupled to the second body through a second pivot shaft, in which the second body is suitable to be stacked on the first upper surface of the first body to make the portable electronic device in a retracted state. The linkage is suitable to rotate relatively to the first body so that the first body and the second body of the portable electronic device are side by side in an expanded state.

18 Claims, 7 Drawing Sheets

PORTABLE ELECTRONIC DEVICE

CROSS-REFERENCE TO RELATED APPLICATION

This application claims the priority benefit of Taiwan application serial no. 100129770, filed on Aug. 19, 2011. The entirety of the above-mentioned patent application is hereby incorporated by reference herein and made a part of this specification.

BACKGROUND OF THE INVENTION

1. Field of the Invention

The invention generally relates to a portable electronic device, and more particularly, to a portable electronic device with double displays.

2. Description of Related Art

In recent years, for the convenience of carry, all portable electronic devices are developing towards the light, slim, short and small tendency. In order to be portable with a user, an end product thereof is designed mostly based on a portable electronic device of folding-type or sliding-type architecture so as to achieve the maximal space utilization.

Taking a folding-type portable electronic device as an example, since when a common folding-type one is in an unfolded state, the interval between two displaying regions is too wide so that the frame is divided into two ones, which causes incontinuous visual sensation and further affects the convenience of usage.

In terms of a sliding-type portable electronic device, the upper and lower two bodies thereof can relatively slide to get an expanded state. However, it has disadvantages of more complex mechanism design, lots of parts and uneasy assembling.

SUMMARY OF THE INVENTION

Accordingly, one scope of the invention is directed to a linkage mechanism applied in a portable electronic device to solve the above-mentioned problem encountered by the prior art.

The invention provides a portable electronic device, which includes a first body, a second body and a linkage. The first body has a first upper surface, a bottom surface opposite to the first upper surface, a first end surface and a second end surface opposite to the first end surface. The second body has a second upper surface. The linkage is coupled to the first body through a first pivot shaft and to the second body through a second pivot shaft, in which the first pivot shaft and the second pivot shaft are substantially parallel to each other. The second body is suitable to be stacked on the first upper surface of the first body to make the portable electronic device in a retracted state, and when the portable electronic device is in an expanded state, the second body and the second end surface side of the first body are side by side and the first upper surface is substantially coplanar with the second upper surface. When the portable electronic device is in the retracted state, an intersected point of the first end surface of the first body and the bottom surface is taken as original point, a direction extending from the original point towards the second end surface along the bottom surface serves as X axis, a direction extending from the original point towards the first upper surface along the first end surface serves as Y axis, coordinates on X-Y plane of the first pivot shaft are ($X_{C1}$, $Y_{C1}$) and coordinates on X-Y plane of the second pivot shaft are ($X_{C2}$, $Y_{C2}$), then:

$$X_{C2}=[(Y_{C2}-Y_{C1})^2+X_{C1}^2-(W-X_{C1}+\delta_H)^2]/[2(W+\delta_H)];$$

$$Y_{C2}=H_U+Y_{C1}+\delta_V;$$

in which W is length of the first body on X axis direction; $H_B$ is thickness of the first body on Y axis direction; $H_U$ is thickness of the second body on Y axis direction; L is distance between the first pivot shaft and the second pivot shaft on X-Y plane; $\delta_H$ is interval between the first body and the second body on X axis direction when the portable electronic device is in the expanded state; and $\delta_V$ is interval between the first body and the second body on Y axis direction when the portable electronic device is in the retracted state.

In an embodiment of the present invention, a bottom end of the above-mentioned linkage is substantially coplanar with the bottom surface of the first body when the portable electronic device is in the expanded state.

In an embodiment of the present invention, the above-mentioned linkage includes two supporting arms and a connection rod. The two supporting arms are respectively disposed at both opposite sides of the first body and are substantially parallel to each other, in which both ends of each of the supporting arms are respectively pivoted to the first body and the second body through the first pivot shaft and the second pivot shaft. The connection rod is connected between the two supporting arms.

In an embodiment of the present invention, each of the above-mentioned supporting arms has at least one bended portion and the bended portion is substantially coplanar with the bottom surface of the first body when the portable electronic device is in the expanded state.

In an embodiment of the present invention, each of the supporting arms is a straight rod.

In an embodiment of the present invention, the above-mentioned first body contains a first display located at the first upper surface.

In an embodiment of the present invention, the above-mentioned second body contains a second display located at the second upper surface.

In an embodiment of the present invention, the above-mentioned first body contains a first display located at the first upper surface, and meanwhile the above-mentioned second body contains a second display located at the second upper surface.

In an embodiment of the present invention, the above-mentioned first display has touch function.

In an embodiment of the present invention, the above-mentioned second display has touch function.

In an embodiment of the present invention, the above-mentioned linkage is made of a material with certain structure strength such as plastic, metal or compound material.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
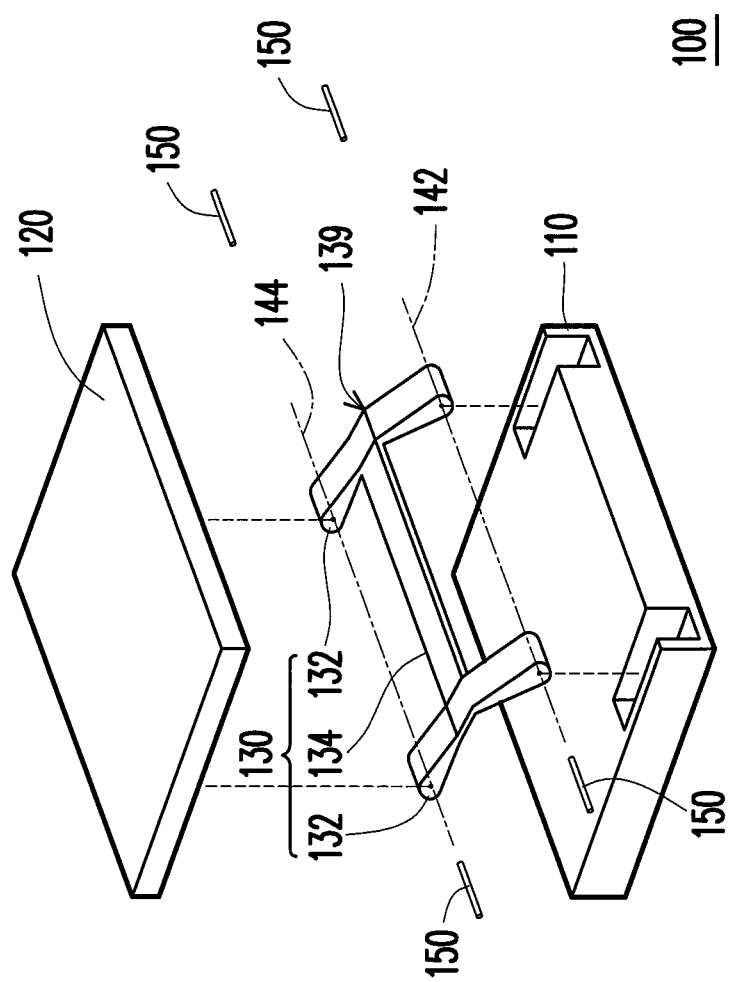
FIG. 1 is an exploded view of a portable electronic device according to an embodiment of the invention.

FIG. 1 is an exploded view of a portable electronic device according to an embodiment of the invention. Referring to FIG. 1, a portable electronic device 100 includes a first body 110, a second body 120 and a linkage 130. The linkage 130 is respectively coupled to the first body 110 through a first pivot shaft 142 (for example, a bolt) and the second body 120 through a second pivot shaft 144 (for example, a bolt) so as to form a rotation mechanism. The first pivot shaft 142 and the second pivot shaft 144 are substantially parallel to each other. In this way, the relative position between the first body 110 and the second body 120 can be changed along with the movement of the linkage 130 so that the above-mentioned portable electronic device can be switched between an expanded state and a retracted state.

The linkage 130 can be configured in various ways. In the embodiment, the linkage 130 is, for example, composed of two supporting arms 132 and a connection rod 134. In more details, the two supporting arms 132 are respectively disposed at the two opposite sides of the first body 110 and substantially parallel to each other. Both ends of each of the supporting arms 132 are respectively pivoted to the first body 110 through the first pivot shaft 142 and the second body 120 through the second pivot shaft 144. The connection rod 134 is connected between the two supporting arms 132 so as to make the two supporting arms 132 synchronously move. The linkage 130 is made of a material with certain structure strength such as plastic, metal or composite material.

Figure 2A:
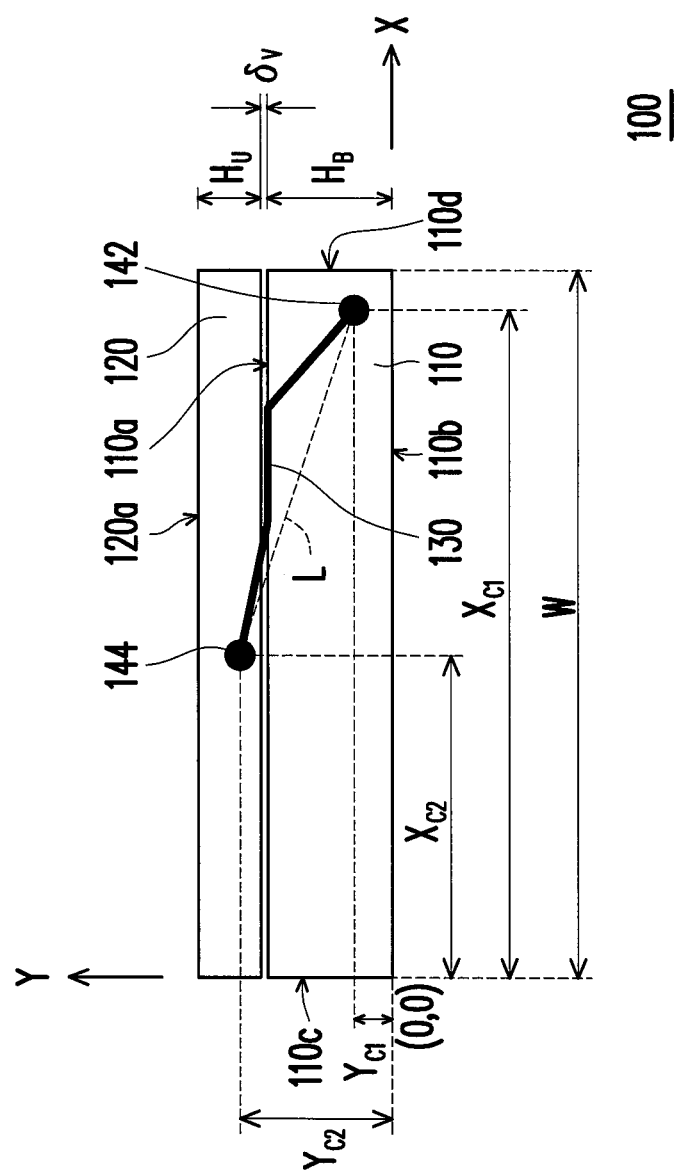
FIGS. 2A and 2B are action schematic diagrams of the portable electronic device 100.
Figure 2B:
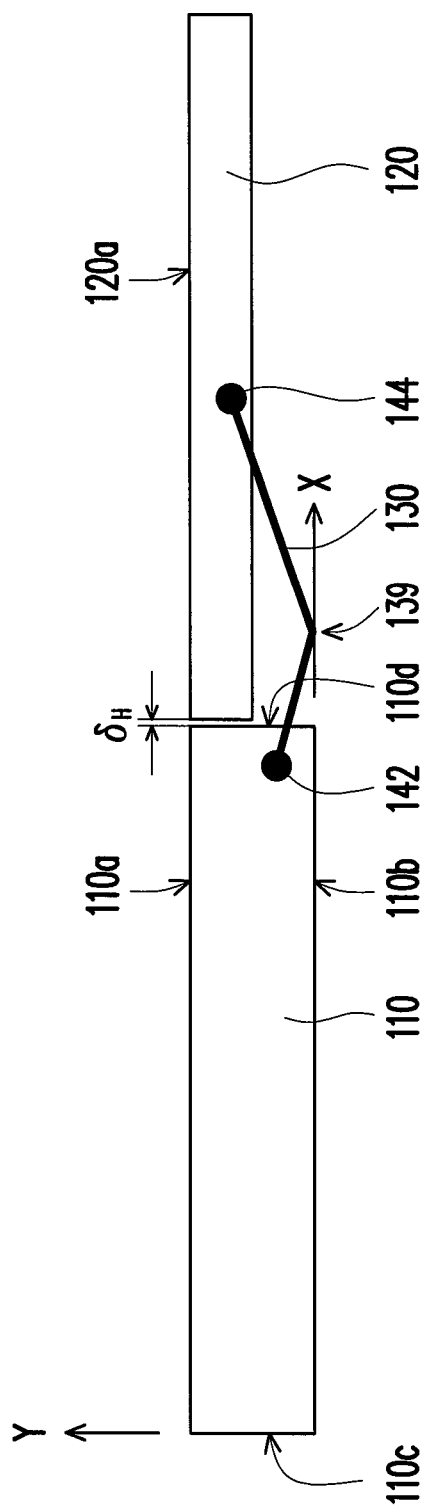

FIGS. 2A and 2B are action schematic diagrams of the portable electronic device 100, in which FIG. 2A is corresponding to the portable electronic device 100 in the retracted state and FIG. 2B is corresponding to the portable electronic device 100 in the expanded state. When the portable electronic device 100 is in the retracted state shown by FIG. 2A, the second body 120 is stacked on an upper surface 110a of the first body 110, so that the portable electronic device 100 occupies a less space and is easy to be carried. In addition, the connection rod 134 of the linkage 130 can be accommodated in an accommodation space (not shown) at the rear side of the second body 120 in the retracted state for saving the integral thickness of the portable electronic device 100. The linkage 130 is suitable to pivot relatively to the first body 110 to make the second body 120 lift up and depart from the upper surface 110a of the first body 110 and meanwhile bring the second body 120 moving to a side of the first body 110 so that the portable electronic device 100 is in the expanded state shown by FIG. 2B. When the portable electronic device 100 is in the expanded state shown by FIG. 2B, the first body 110 and the second body 120 are side by side and the upper surface 110a of the first body 110 would be substantially coplanar with the upper surface 120a of the second body 120, which is helpful to realize various functions; for example, when the upper surface 110a of the first body 110 has a display and the upper surface 120a of the second body 120 has also a display, it can produce various functions, for example, to realize seamless displaying, seamless double screens and the touch and interactive operations.

On the other hand, since the thicknesses of the first body 110 and the second body 120 may are different from each other, for example, the thickness of the second body 120 may be less than the thickness of the first body 110, the embodiment further makes the bottom end 139 of the linkage 130 substantially coplanar with the bottom surface 110b of the first body 110 when the portable electronic device 100 is in the expanded state. In this way, the portable electronic device 100 can be firmly horizontally placed on a plane to advance the usage convenience. In more details, taking the linkage 130 composed of the two supporting arms 132 and the connection rod 134 in FIG. 1 as an example, each of the supporting arms 132 has at least one bended portion 139 and the bended portion 139 is substantially coplanar with the bottom surface 110b of the first body 110 when the portable electronic device is in the expanded state so that the portable electronic device 100 can be firmly supported.

Figure 3:
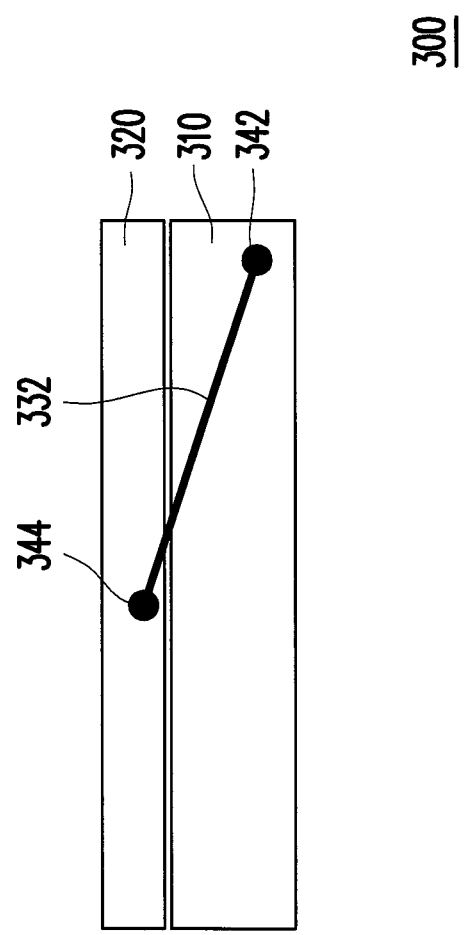
FIG. 3 is a schematic diagram of a portable electronic device according to another embodiment of the invention.

The invention is not limited to the above-mentioned configuration shape of the linkage 130. FIG. 3 is a schematic diagram of a portable electronic device 300 according to another embodiment of the invention. The portable electronic device 300 is similar to the portable electronic device 100 of the previous embodiment except that the supporting arms 332 of the linkage 130 are straight rods and the linkage 130 is respectively pivoted to the first body 310 and the second body 320 through the first pivot shaft 342 and the second pivot shaft 344.

In the embodiment, the relative positions between the linkage, the first pivot shaft and the second pivot shaft are critical to affect the portable electronic device for smooth action. In this regard, the length of the linkage and the positions of the first pivot shaft and the second pivot shaft must be properly estimated and designed.

Taking the portable electronic device 100 of FIGS. 2A and 2B as an example, in addition to the upper surface 110a and the bottom surface 110b, the first body 110 further has a first surface 110c and a second surface 110d both connected between the upper surface 110a and the bottom surface 110b, and the second surface 110d is opposite to the first surface 110c. The intersected point of the first surface 110c and the bottom surface 110b of the first body 110 is defined as original point. A direction extending from the original point towards the second surface 110d along the bottom surface 110b serves as X axis, a direction extending from the original point towards the upper surface 110a along the first surface 110c serves as Y axis, and assuming the coordinates of the first pivot shaft 142 on X-Y plane are $(X_{C1}, Y_{C1})$ and the coordinates of the second pivot shaft 144 on X-Y plane are $(X_{C2}, Y_{C2})$, then, the positions of the first pivot shaft 142 and the second pivot shaft 144 on X-Y plane must satisfy the following equation:

$$X_{C2}[(Y_{C2}-Y_{C1})^2+X_{C1}^2-(W-X_{C1}+\delta_H)^2]/[2(W+\delta_H)];$$

$$Y_{C2}=H_U+Y_{C1}+\delta_V;$$

in which W is a length of the first body 110 on X axis direction;

$H_B$ is a thickness of the first body 110 on Y axis direction;

$H_U$ is a thickness of the second body 120 on Y axis direction;

L is an effective length of the linkage 130, i.e., the shortest distance between the first pivot shaft 142 and the second pivot shaft 144 on X-Y plane;

$\delta_H$ is an interval between the first body 110 and the second body 120 on X axis direction when the portable electronic device 100 is in the expanded state; and $\delta_V$ is an interval between the first body 110 and the second body 120 on Y axis direction when the portable electronic device 120 is in the retracted state.

By means of the above-mentioned estimation and design on the length of the linkage 130 and the positions of the first pivot shaft 142 and the second pivot shaft 144, the invention can avoid inappropriate interference between the structure parts and thereby prevent the portable electronic device 100 from failing smooth action. Meanwhile, the above-mentioned design consideration can also avoid an excessive interval between the first body 110 and the second body 120 in retracted state or in expanded state to affect the appearance, operation or executing normal functions of the portable electronic device 100. For example, when the portable electronic device 100 is in the expanded state, an excessive interval between the first body 110 and the second body 120 may lead double screens in displaying state to an discontinuous frame problem, or, during touch operations switched between the first body 110 and the second body 120, may affect the touch-feel and the fluency of the operations.

Figure 4:
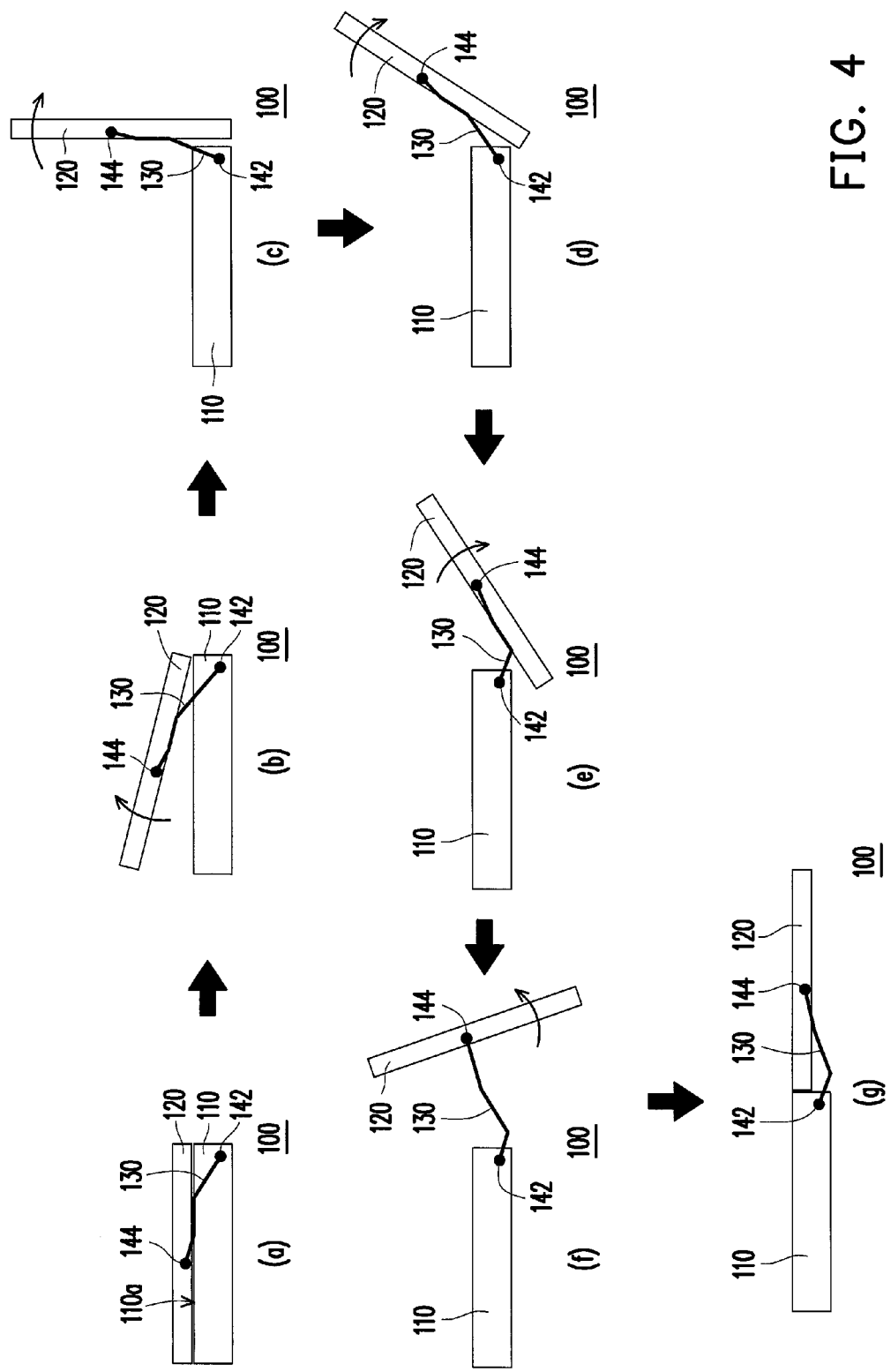
FIG. 4 is a diagram showing an action mode from a retracted state to an expanded state with the portable electronic device of FIG. 1.

The feasible action workflow of the portable electronic device in the invention is further explained as follows. Taking the portable electronic device 100 of the above-mentioned embodiment as an example and referring to FIG. 4, FIG. 4 is a diagram showing an action mode from a retracted state to an expanded state with the portable electronic device 100. First as shown by stage (a), the portable electronic device 100 is in the retracted state, and the second body 120 is stacked on the upper surface 110a of the first body 110. Next as shown by stages (b)-(e), both the second body 120 and the linkage 130 together perform clockwise rotation around the first pivot shaft 142. Then as shown by stage (f), the second body 120 performs anticlockwise rotation around the second pivot shaft 144 so as to reach the expanded state as shown by stage (g).

Figure 5:
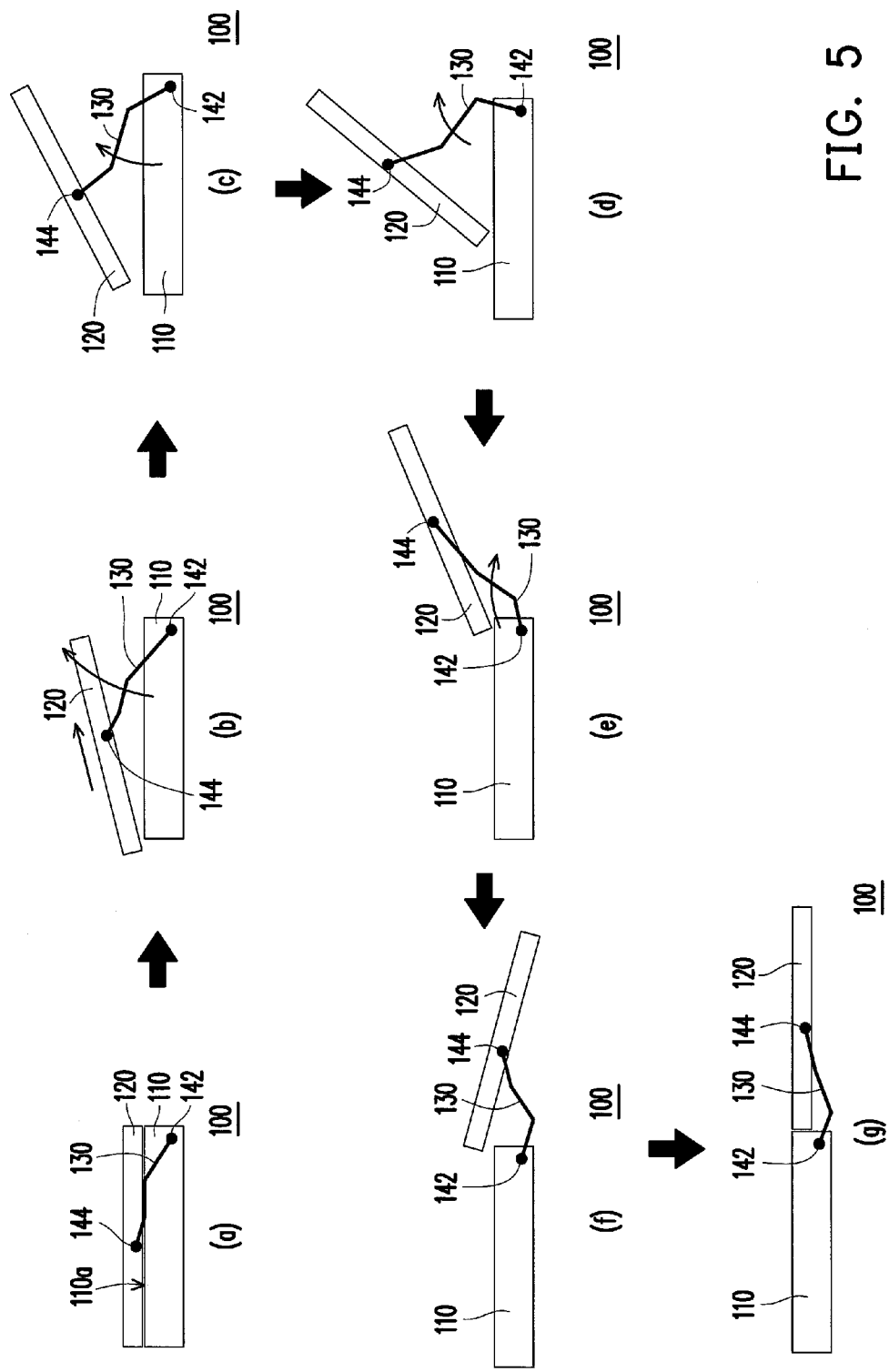
FIG. 5 is a diagram showing another action mode from a retracted state to an expanded state with the portable electronic device of FIG. 1.

FIG. 5 is a diagram showing another action mode from a retracted state to an expanded state with the portable electronic device 100. First as shown by stage (a), the portable electronic device 100 is in the retracted state, and the second body 120 is stacked on the upper surface 110a of the first body 110. Next as shown by stages (b)-(e), both the second body 120 and the linkage 130 perform complex moving of relative motion and rotation respectively around the second pivot shaft 144 and the first pivot shaft 142. At the time, the second body 120 performs anticlockwise rotation around the second pivot shaft 144 and the linkage 130 performs clockwise rotation around the first pivot shaft 142. Then as shown by stage (f), the linkage 130 has turned to its target position, while the second body 120 continuously performs anticlockwise rotation around the second pivot shaft 144 so as to reach the expanded state as shown by stage (g).

The major difference between the above-mentioned two action modes is that when the linkage 130 performs clockwise rotation around the first pivot shaft 142, whether or not the second body 120 simultaneously performs anticlockwise rotation around the second pivot shaft 144. For the first action mode, when both the second body 120 and the linkage 130 perform clockwise rotation around the first pivot shaft 142, there is no relative rotation between the second body 120 and the second pivot shaft 144. For the second action mode, when the linkage 130 performs clockwise rotation around the first pivot shaft 142, the second body 120 simultaneously performs anticlockwise rotation around the second pivot shaft 144.

Although FIGS. 4 and 5 respectively illustrate feasible action ways of the portable electronic device in the invention, which however the action way of the portable electronic device is not limited to. In fact, the action way can be adjusted or modified in some possible extents according to the mechanism design or the operation habit of a user. In addition, a user can operate the portable electronic device 100 following the reverse workflow of FIGS. 4 and 5 to make the portable electronic device 100 from the expanded state back to the retracted state.

By using the linkage to realize the expanded action or the retracted action between the two bodies in the portable electronic device, the invention can make the two upper surfaces of the two bodies substantially coplanar with each other after the two bodies being expanded so as to produce various functions, for example, to realize seamless displaying, seamless double screens and the touch and interactive operations.

Figure 6:
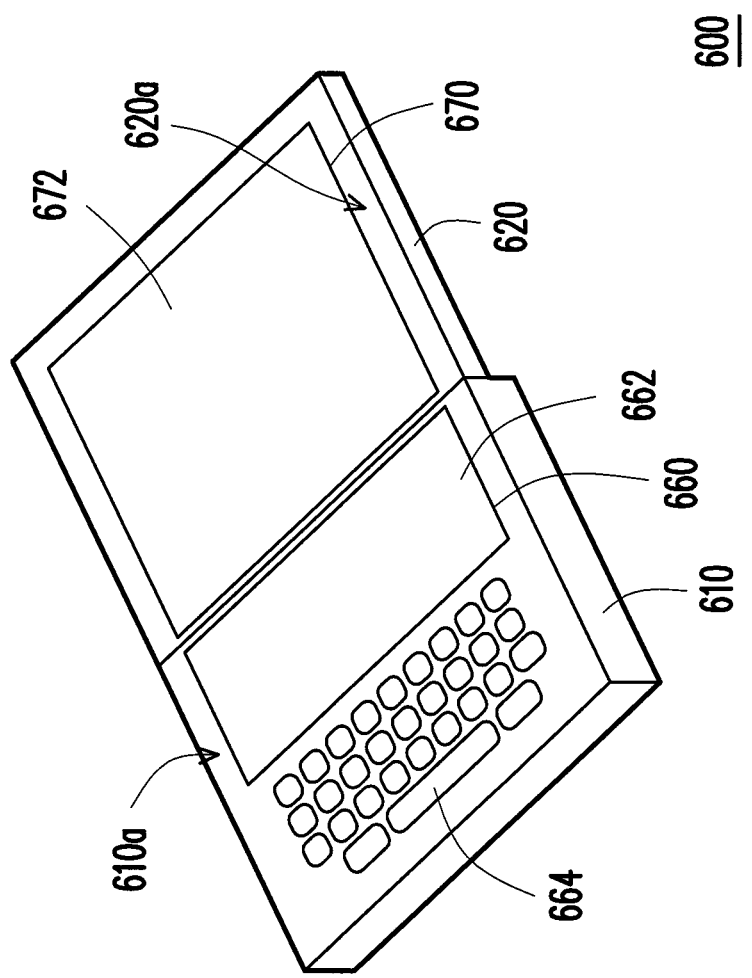
FIG. 6 is a schematic diagram of a portable electronic device with double screens according to yet another embodiment of the invention.

Taking FIG. 6 as an example, FIG. 6 is a schematic diagram of a portable electronic device 600 with double screens according to yet another embodiment of the invention. Referring to FIG. 6, a first body 610 contains a first display 660 located at the upper surface 610a of the first body 610. A second body 620 contains a second display 670 located at the upper surface 620a of the second body 620, in which both the first display 660 and the second display 670 are displays with touch function and preferably, displays with narrow frames. When the portable electronic device 600 is in expanded state, the first display 660 and the second display 670 are coplanar with each other so as to together display an image frame or to allow a user to perform interactive touch operations. For example, the second display 670 is used for displaying a second frame 672 while the first display 660 is used to display a first frame 662 and provide a virtual keyboard 664 (for example, the keyboard 664 displayed by the first frame 662) serving as an input interface for the user. By means of the mechanism design of the above-mentioned embodiments, the first body 610 and the second body 620 can be smoothly in retracted state and in expanded state, and the gap between the first body 610 and the second body 620 is reduced so as to realize seamless frame displaying and to advance the touch-feel and the fluency of the operations.

In summary, in the portable electronic device of the invention, by using the linkage to realize the expanded action and the retracted action between the two bodies, the invention can make the two upper surfaces of the two bodies substantially coplanar with each other after the two bodies being expanded so as to produce various functions, for example, to realize seamless displaying, seamless double screens and the touch and interactive operations. Since the mechanism design of the linkage is simple and the number of the required employed parts is less, the invention can reduce fabrication cost and make assembling the mechanism more conveniently. In addition, due to the simplified mechanism design, the volume of the portable electronic device can be reduced which is helpful for the products developed towards slim tendency.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A portable electronic device, comprising:
a first body, having a first upper surface, a bottom surface opposite to the first upper surface, a first surface and a second surface both connecting between the first upper surface and the bottom surface, and the second surface opposite to the first surface;

a second body, having a second upper surface; and a linkage, pivoted to the first body through a first pivot shaft and to the second body through a second pivot shaft, wherein the first pivot shaft and the second pivot shaft are substantially parallel to each other, and the second body is suitable to be stacked on the first upper surface of the first body to make the portable electronic device in a retracted state, and when the portable electronic device is in an expanded state, the second body and the first body are side by side, the second body is disposed adjacent to the second surface of the first body, and the first upper surface is substantially coplanar with the second upper surface, wherein when the portable electronic device is in the retracted state, an intersected point of the first surface of the first body and the bottom surface is taken as an original point, a direction extending from the original point towards the second surface along the bottom surface serves as X axis, a direction extending from the original point towards the first upper surface along the first surface serves as Y axis, coordinates of the first pivot shaft on X-Y plane are $(X_{C1}, Y_{C1})$ and coordinates of the second pivot shaft on X-Y plane are $(X_{C2}, Y_{C2})$, then:

$$X_{C2}=[(Y_{C2}-Y_{C1})^2+X_{C1}^2-(W-X_{C1}+\delta_H)^2]/[2(W+\delta_H)];$$

$$Y_{C2}=H_U+Y_{C1}+\delta_V;$$

wherein W is a length of the first body on X axis direction;
$H_B$ is a thickness of the first body on Y axis direction;
$H_U$ is a thickness of the second body on Y axis direction;
L is a distance between the first pivot shaft and the second pivot shaft on X-Y plane;
$\delta_H$ is an interval between the first body and the second body on X axis direction when the portable electronic device is in the expanded state; and
$\delta_V$ is an interval between the first body and the second body on Y axis direction when the portable electronic device is in the retracted state.

2. The portable electronic device as claimed in claim 1, wherein a bottom end of the linkage is substantially coplanar with the bottom surface of the first body when the portable electronic device is in the expanded state.

3. The portable electronic device as claimed in claim 1, wherein the linkage comprises:
   two supporting arms, disposed at both opposite sides of the first body and substantially parallel to each other, wherein both ends of each of the supporting arms are respectively pivoted to the first body and the second body through the first pivot shaft and the second pivot shaft; and
   a connection rod, connected between the two supporting arms.

4. The portable electronic device as claimed in claim 3, wherein each of the supporting arms has at least one bended portion and the bended portion is substantially coplanar with the bottom surface of the first body when the portable electronic device is in the expanded state.

5. The portable electronic device as claimed in claim 3, wherein each of the supporting arms is a straight rod.

6. The portable electronic device as claimed in claim 1, wherein the first body contains a first display located at the first upper surface.

7. The portable electronic device as claimed in claim 1, wherein the second body contains a second display located at the second upper surface.

8. The portable electronic device as claimed in claim 6, wherein the first display has touch function.

9. The portable electronic device as claimed in claim 7, wherein the second display has touch function.

10. The portable electronic device as claimed in claim 1, wherein the linkage is made of a material with certain structure strength selected from plastic, metal or composite material.

11. A portable electronic device with double displays, comprising:
    a first body, having a first upper surface, a bottom surface opposite to the first upper surface, a first surface and a second surface both connecting the first upper surface and the bottom surface, and the second surface opposite to the first surface;
    a second body, having a second upper surface;
    a first display located at the first upper surface;
    a second display located at the second upper surface; and
    a linkage, pivoted to the first body through a first pivot shaft and to the second body through a second pivot shaft, wherein the first pivot shaft and the second pivot shaft are substantially parallel to each other, and the second body is suitable to be stacked on the first upper surface of the first body to make the portable electronic device in a retracted state, and when the portable electronic device is in an expanded state, the second body and the first body are side by side, the second body is disposed adjacent to the second surface of the first body, and the first display is substantially coplanar with the second display, wherein
    when the portable electronic device is in retracted the state, an intersected point of the first surface of the first body and the bottom surface is taken as original point, a direction extending from the original point towards the second surface along the bottom surface serves as X axis, a direction extending from the original point towards the first upper surface along the first surface serves as Y axis, coordinates of the first pivot shaft on X-Y plane are $(X_{C1}, Y_{C1})$ and coordinates of the second pivot shaft on X-Y plane are $(X_{C2}, Y_{C2})$, then:

$$X_{C2}=[(Y_{C2}-Y_{C1})^2+X_{C1}^2-(W-X_{C1}+\delta_H)^2]/[2(W+\delta_H)];$$

$$Y_{C2}=H_U+Y_{C1}+\delta_V;$$

wherein W is a length of the first body on X axis direction;
$H_B$ is a thickness of the first body on Y axis direction;
$H_U$ is a thickness of the second body on Y axis direction;
L is a distance between the first pivot shaft and the second pivot shaft on X-Y plane;
$\delta_H$ is an interval between the first body and the second body on X axis direction when the portable electronic device is in the expanded state; and
$\delta_V$ is an interval between the first body and the second body on Y axis direction when the portable electronic device is in the retracted state.

12. The portable electronic device as claimed in claim 11, wherein a bottom end of the linkage is substantially coplanar with the bottom surface of the first body when the portable electronic device is in the expanded state.

13. The portable electronic device as claimed in claim 11, wherein the linkage comprises:
    two supporting arms, disposed at both opposite sides of the first body and substantially parallel to each other, wherein both ends of each of the supporting arms are respectively pivoted to the first body and the second body through the first pivot shaft and the second pivot shaft; and a connection rod, connected between the two supporting arms.

14. The portable electronic device as claimed in claim 13, wherein each of the supporting arms has at least one bended portion and the bended portion is substantially coplanar with the bottom surface of the first body when the portable electronic device is in the expanded state.

15. The portable electronic device as claimed in claim 13, wherein each of the supporting arms is a straight rod.

16. The portable electronic device as claimed in claim 11, wherein the first display has touch function.

17. The portable electronic device as claimed in claim 11, wherein the second display has touch function.

18. The portable electronic device as claimed in claim 11, wherein the linkage is made of a material with certain structure strength selected from plastic, metal or composite material.

* * * * *